United States Patent Office 3,065,739
Patented Nov. 27, 1962

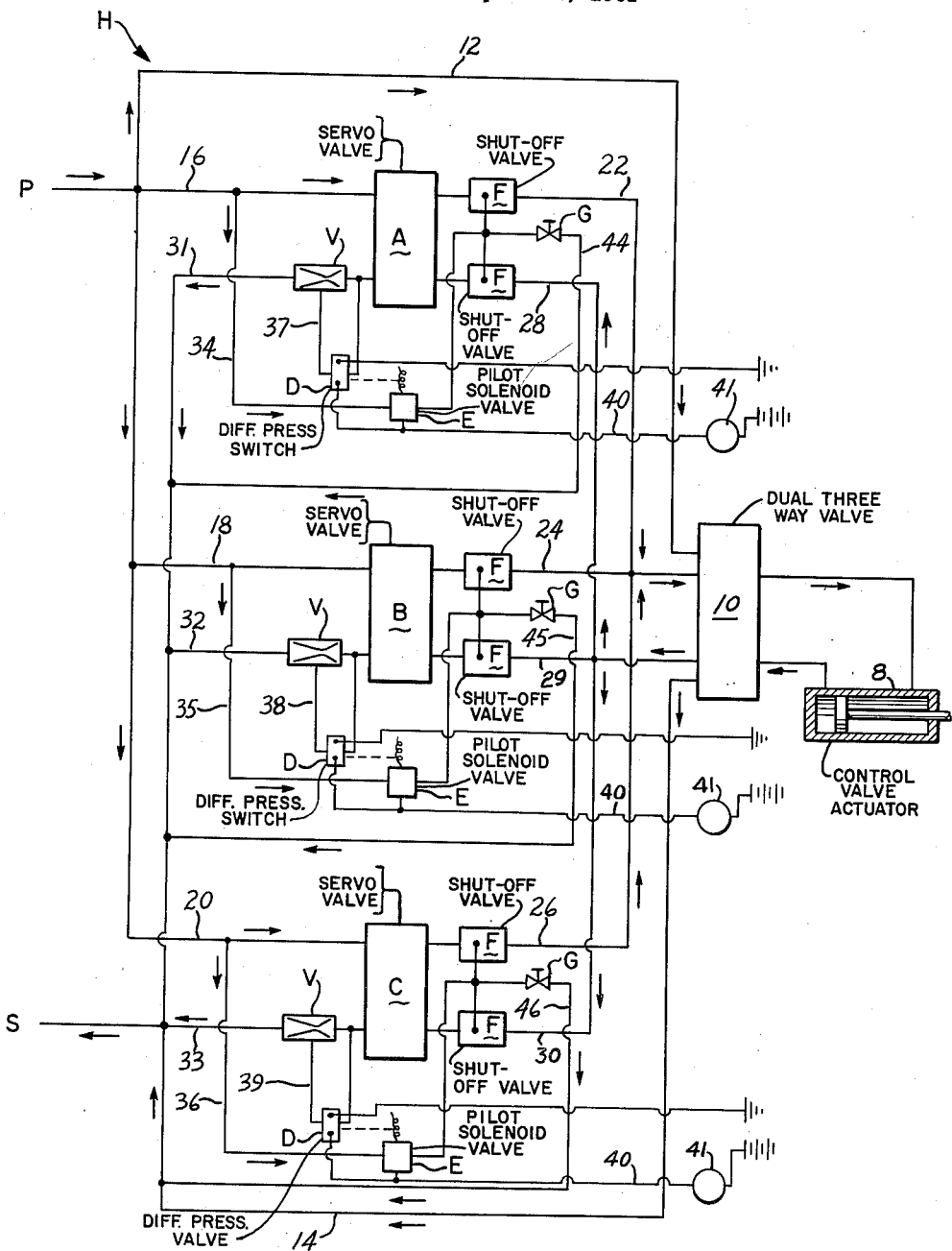

3,065,739
CONTROL SYSTEM
Norman Harvey Boroson, Succasunna, N.J., assignor to Thiokol Chemical Corporation, Bristol, Pa., a corporation of Delaware
Filed Apr. 26, 1961, Ser. No. 105,707
15 Claims. (Cl. 121—47)

This invention relates generally to servo control systems and more particularly to a means of detecting and isolating a single malfunctioning system.

Use is made of servo control systems in the application of Bernard Pearlman, et al., Serial Number 812,483, filed May 11, 1959, for an Internal Combustion Catapult Powerplant. Successful operation of the catapult powerplant is dictated by the requirement for single malfunction safety as during the actual period of launching, the servo system must maintain complete control in order to achieve a specified end speed of the catapult.

However, the operation of a single servo control system does not protect the catapult powerplant in the event of a malfunction of any servo component and all attempts to develop such a system with single malfunction safety have resulted in either overly complex detection devices or in what would be termed an abortive catapult launch.

It has been determined that the operation of three parallel servo control systems which are hydraulically connected will minimize the effect of any single servo malfunction. However, it is necessary to be able to detect and to isolate the hydraulic flow through the servo valve of the malfunction system in order to prevent what would amount to a hydraulic short circuit. Insofar as is known, a detection, comparison and isolation system which is not extremely complex has never been developed.

There are two major types of malfunctions which can drastically effect the performance of the powerplant. One of these is the open malfunction where the servo valve directs the full hydraulic flow to the opening side of the actuator of the main control valves. The other is the closed malfunction which effectively tends to close the main control valves.

During either type of malfunction, the hydraulic flow in the valve which is in the malfunctioning system will increase to twice the amount of flow in both of the valves in the properly functioning systems. This flow has been measured at up to 60 gallons per minute in the valve of the malfunctioning system.

This is in contrast to a hydraulic flow during normal operation of the three parallel servo control systems, which never exceeds a maximum of 5 to 7 gallons per minute, and this is only during the initial control valve opening period. The closing of the control valves at the end of the operation is the only time that the hydraulic flow exceeds the 5 to 7 gallons per minute level and during this portion of the run, the malfunction detection device is disconnected electrically.

Accordingly, the main object of the present invention is to provide a single malfunction protection system for a triple servo control system.

An important object of the present invention is to provide a means of detecting and isolating a single malfunctioning system when operating three parallel servo control systems.

Another important object of the present invention is to provide a simple detection, comparison and isolation system which will minimize the effect of any single servo malfunction in three hydraulically connected and parallel servo control systems.

A further important object of the present invention is to provide a system of the type described including means for indicating which servo control system is malfunctioning.

A still further important object of the present invention is to provide a system of the type described in which the shut-off valves may be manually reset to avoid the inadvertent use of a malfunctioning system as is more likely with systems having automatically reset shut-off valves.

Other objects and advantages of the present invention will become apparent during the course of the following description.

In the drawings I have shown one embodiment of the invention. In this showing:

The single FIGURE of the drawings is a schematic representation of the protection system comprising the invention.

Referring to the drawings, the three parallel and hydraulically connected servo control systems receive hydraulic pressure fluid at P and exhaust it at S. The dual 3-way valve 10 may be used to bypass the three systems and hydraulically lock the control valve actuator 8 in a standby or safety condition. The flow to and from the valve 10 being by way of pressure fluid conduit 12 and exhaust fluid conduit 14.

The three servo control systems are identical and their servo valves are respectively identified as A, B, and C to respectively distinguish each system.

Pressure fluid is supplied to the servo valves A, B, and C by conduits 16, 18, and 20 and then passes to the control valve actuator 8 by conduits 22, 24, and 26 and the 3-way valve 10, and returns to the servo valves by conduits 28, 29, and 30 and thence to exhaust S by conduits 31, 32, and 33, respectively.

Each of the three systems includes a pressure operated shut-off valve F downstream and subsequently upstream of the servo valves A, B, and C in the conduits 22, 24, and 26 and 28, 29, and 30 respectively and a venturi V in the downstream exhaust lines 31, 32, and 33. Pressure fluid is conducted to the shutoff valves F by means of branch conduits 34, 35, and 36 each controlled by a pilot solenoid valve E which includes a contact and circuit means generally indicated as a whole as 40 so as to operate a signal such as a light 41 upon opening of any of the valves E and indicate the location of a malfunction.

The valve E of each servo system is operated by a differential pressure switch D mounted in conduits 37, 38, and 39 so as to be subject to the line pressure and to venturi V pressure in the conduits 31, 32, and 33.

During operation of the triple servo control system described, a malfunction of either the open or of the closed type in any one of the three servo systems will result in a hydraulic flow increase. If, for example, the malfunction is in servo valve A, the flow thereto will increase from 5 to 7 gallons per minute up to 60 gallons per minute while the flow to the servo valves B and C will be doubled.

The surge in the system of the servo valve A will be detected by the venturi V and operate the differential pressure switch D in the conduit 37 which in turn operates the small pilot valve E to permit flow of pressure fluid through the conduit 34 to the pressure operated shutoff valves F. As shown, the valves F are installed so that upon closing, they isolate the malfunctioning servo system, in the example given, that of the servo valve A.

It is to be noted that such isolation prevents the unloading and rapid collapse of the hydraulic system H as a whole to thereby allow the two normally functioning servo systems, B and C, to maintain control and complete the operation within specified tolerances.

The location of the malfunction is, of course, indicated by the signal light 41. After repair of the malfunction, or in order to check the system to determine the cause of the malfunction, it is necessary to reset the shut-off valves F by venting the hydraulic pressure which holds them closed. This is effected by hand valves G connected to the exhaust S by conduits 44, 45, and 46. The manual reset feature is used in order to prevent the inadvertent use of a malfunctioned system as might be more likely with an automatic reset feature.

It is to be understood that the form of the invention herewith shown and described is to be taken as a preferred example of the same and that various changes in the shape, size and arrangement of parts may be resorted to without departure from the spirit of the invention or the scope of the subjoined claims.

What is claimed is:

1. In combination, a control valve actuator, a plurality of parallel servo control systems hydraulically connected therewith and with each other, each control system including a servo valve and pressure-operated shut-off valves and conduits connecting the same, and means responsive to conduit pressure in said systems for detecting a malfunction therein.

2. The combination recited in claim 1 and additional means operable by said first means to signal in which system a malfunction has occured.

3. The combination recited in claim 1 wherein said means includes a venturi arranged in a conduit of each system, and a differential pressure switch operable in response to abnormal pressure in said venturi and in said conduit.

4. The combination recited in claim 3 and signal means operable by said first means to indicate in which system a malfunction has occured.

5. The combination recited in claim 1 and additional means operable by said first means to close said shut-off valves in the system of the malfunction.

6. The combination recited in claim 5 and signal means operable by said first means to indicate in which system a malfunction has occurred.

7. The combination recited in claim 5 and a manual reset valve in each system and operable to bleed a system to effect reopening of its shut-off valves.

8. The combination recited in claim 5 wherein said first means includes a venturi arranged in a conduit of each system, and a differential pressure switch operable in response to abnormal pressure in said venturi and in said conduit.

9. The combination recited in claim 8 wherein operation of said differential pressure switch energizes a solenoid valve to admit hydraulic pressure to said shut-off valves.

10. The combination recited in claim 9 wherein operation of said solenoid valve closes a signal circuit to indicate the location of a malfunction in the systems.

11. The combination recited in claim 9 and a manual reset valve in each system and operable to bleed a system to effect reopening of its shut-off valves.

12. A safety system for a plurality of parallel hydraulically connected servo control systems each having servo, vent, and fluid actuated shut-off valves and conduits connecting the same comprising means connected to the servo systems for detecting a malfunction in any one of them, and means responsive to said detection means upon the occurrence of a malfunction to isolate the malfunctioning servo system from the other servo systems to permit the latter to complete the control functions.

13. A safety system as recited in claim 12 wherein said detection means comprises a venturi arranged in a conduit, and a differential pressure switch operable in response to the conduit and venturi pressure to indicate a malfunction flow surge in the servo control systems.

14. A safety system as recited in claim 12 wherein said responsive means comprises a pilot valve operable to admit hydraulic operating fluid to said shut-off valves in the malfunctioning servo system.

15. A safety system as recited in claim 14, and manual reset valves in each system and operable to bleed a system with a malfunction to offect reopening of said shut-off valves upon correction of the malfunction.

No references cited.